US011762100B2

(12) United States Patent
Miyamoto et al.

(10) Patent No.: US 11,762,100 B2
(45) Date of Patent: Sep. 19, 2023

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: NEC Solution Innovators, Ltd., Tokyo (JP)

(72) Inventors: Ryo Miyamoto, Tokyo (JP); Maho Kashiwagi, Tokyo (JP); Yuka Kanda, Tokyo (JP)

(73) Assignee: NEC Solution Innovators, Ltd., Tokyo (JP)

(*) Notice: Subject to any disclaimer, the term of this patent is extended or adjusted under 35 U.S.C. 154(b) by 251 days.

(21) Appl. No.: 17/277,868

(22) PCT Filed: Jun. 14, 2019

(86) PCT No.: PCT/JP2019/023642
§ 371 (c)(1),
(2) Date: Mar. 19, 2021

(87) PCT Pub. No.: WO2020/066153
PCT Pub. Date: Apr. 2, 2020

(65) Prior Publication Data
US 2021/0349219 A1  Nov. 11, 2021

(30) Foreign Application Priority Data
Sep. 26, 2018 (JP) ................................. 2018-180823

(51) Int. Cl.
*G01S 19/08* (2010.01)
*G01S 19/37* (2010.01)

(52) U.S. Cl.
CPC .............. *G01S 19/08* (2013.01); *G01S 19/37* (2013.01)

(58) Field of Classification Search
CPC .................................. G01S 19/08; G01S 19/37
USPC ....................................................... 342/357.45
See application file for complete search history.

(56) References Cited

U.S. PATENT DOCUMENTS 9,354,320 B2 * 5/2016 Sasahara ................. G01S 19/21
2016/0291161 A1 10/2016 Nagao

FOREIGN PATENT DOCUMENTS

| JP | 2009-079975 A | 4/2009 |
| JP | 2009-229295 A | 10/2009 |
| JP | 2016-197059 A | 11/2016 |
| JP | 2018-004434 A | 1/2018 |

OTHER PUBLICATIONS

International Search Report for PCT Application No. PCT/JP2019/023642, dated Aug. 6, 2019.

* cited by examiner

Primary Examiner — Harry K Liu
(74) Attorney, Agent, or Firm — Sughrue Mion, PLLC

(57) ABSTRACT

An information processing apparatus includes a positioning signal acquisition unit configured to acquire a positioning signal transmitted from a positioning satellite and a parameter acquisition unit configured to calculate a parameter preset based on the positioning signal. The information processing apparatus further includes an accuracy index calculation unit configured to calculate a positioning accuracy index from the parameter, and an output unit configured to output the positioning accuracy index.

8 Claims, 6 Drawing Sheets

INFORMATION PROCESSING APPARATUS, INFORMATION PROCESSING SYSTEM, INFORMATION PROCESSING METHOD, AND NON-TRANSITORY COMPUTER READABLE MEDIUM

This application is a National Stage Entry of PCT/JP2019/023642 filed on Jun. 14, 2019, which claims priority from Japanese Patent Application 2018-180823 filed on Sep. 26, 2018, the contents of all of which are incorporated herein by reference, in their entirety.

TECHNICAL FIELD

The present disclosure relates to an information processing apparatus, an information processing system, an information processing method, and a program.

BACKGROUND ART

In a mobile body such as an automobile, a navigation system using GNSS (Global Navigation Satellite System) is widely used. In navigation systems, it is important to perform positioning accurately in any kind of environments. However, when a method for positioning the location of a mobile object by a GNSS satellite is used, the location accuracy may degrade due to various factors.

The factors that degrade the location accuracy include, for example, an orbit error of the satellite, a clock error, a fluctuation of the ionosphere, a fluctuation of the troposphere, a signal interception caused by blocking of radio waves by clouds, forests, buildings, etc., and multipath reception caused by reflection of radio waves in forests, high-rise buildings, etc. When accurate location information cannot be acquired, the reliability of the positioning result is lowered.

In order to address this issue, a technique has been proposed for selecting a positioning result with a high degree of reliability based on the degree of reliability of a positioning result using a GNSS function and the degree of reliability of a positioning result using an autonomous navigation positioning (see, for example, Patent Literature 1).

CITATION LIST

Patent Literature

Patent Literature 1: Japanese Unexamined Patent Application Publication No. 2009-229295

SUMMARY OF INVENTION

Technical Problem

The technique disclosed in Patent Literature 1 calculates the degree of reliability of a satellite positioning result based on HDOP (Horizontal Dilution of Precision) information and SN (Signal to Noise Ratio) information. Thus, the calculation is based on the environment to be positioned, and determination based on the actual movement of the object cannot be performed. In other words, the technique described in Patent Literature 1 cannot determine the reliability of the result of satellite positioning.

An object of the present disclosure is to provide an information processing apparatus, an information processing method, and a program which solve the problem that the reliability of the result of satellite positioning cannot be determined.

Solution to Problem

An example aspect is an information processing apparatus including a positioning signal acquisition unit configured to acquire a positioning signal transmitted from a positioning satellite and a parameter acquisition unit configured to calculate a parameter preset based on the positioning signal. The information processing apparatus further includes an accuracy index calculation unit configured to calculate a positioning accuracy index from the parameter, and an output unit configured to output the positioning accuracy index.

Another example aspect is an information processing method including: acquiring a positioning signal transmitted from a positioning satellite; calculating a parameter preset based on the positioning signal; calculating a positioning accuracy index from the parameter; and outputting the positioning accuracy index.

Another example aspect is a program causing a computer to execute an information processing method including: acquiring a positioning signal transmitted from a positioning satellite; calculating a parameter preset based on the positioning signal; calculating a positioning accuracy index from the parameter; and outputting the positioning accuracy index.

Advantageous Effects of Invention

According to the present disclosure, it is possible to provide an information processing apparatus or the like for determining the reliability of a positioning result using a positioning signal received from a GNSS satellite.

DESCRIPTION OF EMBODIMENTS

Figure 1:
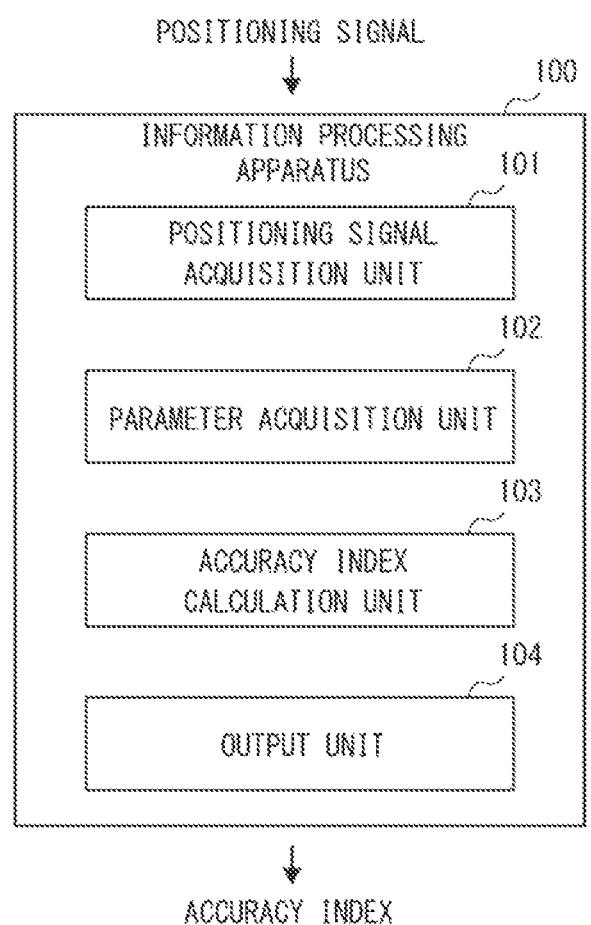
FIG. 1 is a schematic block diagram of an information processing apparatus according to a first example embodiment.

For clarity of explanation, the following description and drawings have been omitted and simplified as appropriate. In the drawings, the same elements are denoted by the same reference numerals, and repeated description is omitted if necessary.

First Example Embodiment

Example embodiments of the present disclosure will be described below with reference to the drawings. FIG. 1 is a schematic configuration diagram of an information processing apparatus according to a first example embodiment. In this example embodiment, the information processing apparatus 100 is incorporated into, for example, a car navigation system. The information processing apparatus 100 acquires a positioning signal transmitted from a GNSS satellite, determines the reliability of a positioning result calculated from the acquired positioning signal, and provides the determination result to the car navigation system. The determination result output by the information processing apparatus 100 is referred to as an accuracy index (or positioning accuracy index). The information processing apparatus 100 includes a positioning signal acquisition unit 101, a parameter acquisition unit 102, an accuracy index calculation unit 103, and an output unit 104 as main components. The details of each component will be described below along a flow of a signal.

The positioning signal acquisition unit 101 acquires the positioning signal supplied from the outside. The positioning signal acquisition unit 101 is, for example, an interface for receiving a positioning signal in accordance with a preset communication protocol. The positioning signal acquisition unit 101 may also be a bus interface that appropriately accepts the positioning signal in response to a request from the outside.

The positioning signal is included in a radio wave transmitted by the GNSS satellite. When the car navigation system receives the radio wave transmitted from the GNSS satellite, the car navigation system amplifies and demodulates the received radio wave. The positioning signal acquisition unit 101 receives the positioning signal demodulated by the car navigation system and supplies the received positioning signal to the parameter acquisition unit 102.

The parameter acquisition unit 102 receives the positioning signal from the positioning signal acquisition unit 101 and acquires a preset parameter from the received positioning signal. The parameter acquired by the parameter acquisition unit 102 includes information included in the signal from each satellite included in the positioning signal, or a (estimated) value estimated (calculated) from the information included in the positioning signal.

An example of calculating the estimated value from the information included in the positioning signal will be described below. A GNSS receiver, such as a car navigation system, calculates a value called a pseudo range to position its location. The pseudo range is calculated by multiplying a propagation time of the positioning signal between the satellite and the receiver measured by a positioning code called PRN (Pseudo-Random Noise) included in the positioning signal by the speed of light. When the pseudo range is defined as Pi, a observation model of the pseudo range can be expressed by the following Formula (1).

[Formula 1]

$$P_i = c(t_r - t^S) + \varepsilon_{Pi} = \rho + c(dt - dT) + I_i + T + \varepsilon_{Pi} \tag{1}$$

In Formula 1, c is the speed of light in a vacuum, $t_r$ is a reception time of the positioning signal at the receiver, $t^S$ is a transmission time of the positioning signal at the satellite, $\varepsilon_{Pi}$ is an observation error, $\rho$ is a geometric distance between the satellite and an observation point, dt is a clock error of the receiver, dT is a clock error of the satellite, $I_i$ is a ionospheric delay, and T is a tropospheric delay. The approximate location can be determined by conducting positioning using the pseudo range calculated by the GNSS receiver. However, the location can be determined with higher accuracy by estimating more detailed parameters as shown in Formula (1).

The GNSS receiver calculates a value called a carrier phase in addition to the above pseudo range. The carrier phase is a continuous measurement of the carrier phase angle of the positioning signal demodulated by the receiver. The GNSS receiver can conduct positioning with higher location accuracy by utilizing the calculated carrier phase. When the carrier phase is defined as Li, the observation model can be expressed by the following Formulas (2) and (3).

[Formula 2]

$$L_i = \lambda_i \Phi_i = \rho + c(dt - dT) - I_i + T + \lambda_i N_i + \varepsilon_{Li} \tag{2}$$

[Formula 3]

$$N_i = \Phi_{0,i}{'} - \Phi_{0,i}^S + n_i \tag{3}$$

In Formulas (2) and (3), Li is a carrier phase as a distance, $\lambda i$ is a carrier wavelength, $\Phi i$ is a carrier phase as a dimensionless quantity, Ni is a carrier phase bias, $\varepsilon Li$ is the observation error, $\Phi_{0r,i}$ is an initial phase of the receiver, $\Phi^S_{0,i}$ is an initial phase of the satellite, and $n_i$ is an integer ambiguity.

By estimating various parameters based on the observation model of the pseudo range and the carrier phase and the positioning signal of the satellite, the location with higher accuracy is obtained. The parameters included in the positioning signal include, for example, a positioning signal transmission clock, signal intensity, navigation message of the satellite, and so on. The parameter acquisition unit 102 estimates the parameters of the error factors expressed by Formulas (1) to (3) in addition to the above parameters acquired from the positioning signal, and supplies them to the accuracy index calculation unit 103.

The accuracy index calculation unit 103 calculates the accuracy index by performing preset accuracy index calculation on the parameters received from the parameter acquisition unit 102. The accuracy index is associated with the positioning signal received by the GNSS receiver, and is a value indicating whether or not the positioning can be performed according to the positioning accuracy expected by a user when the location of the GNSS receiver is positioned using the received positioning signal. That is, the user can determine the reliability of the positioning signal by referring to the positioning signal and the accuracy index. The accuracy index calculation unit 103 calculates the accuracy index from the parameters by a preset method, and supplies the calculated accuracy index to the output unit 104.

Here, an example of the accuracy index calculation will be described. The accuracy index calculation unit 103 includes an accuracy index calculator for performing the accuracy index calculation. The accuracy index calculation unit 103 has previously accumulated a value called an influence coefficient. The accuracy index calculator calculates the accuracy index by multiplying the received parameters by the influence coefficient. The accuracy index calculator may be software, hardware, or a combination thereof.

The output unit 104 outputs the accuracy index received from the accuracy index calculation unit 103 to the outside of the information processing apparatus 100. The output unit 104 is, for example, an interface for outputting the accuracy index to the outside in accordance with the preset communication protocol. The output unit 104 may be a bus interface for appropriately outputting buffered signals in response to a request from an output destination.

When the output unit 104 outputs the accuracy index, the output unit 104 also outputs information about the positioning signal corresponding to the output accuracy index. The information about the positioning signal corresponding to the output accuracy index is, for example, identification information unique to the satellite and the reception time of the positioning signal.

Figure 2:
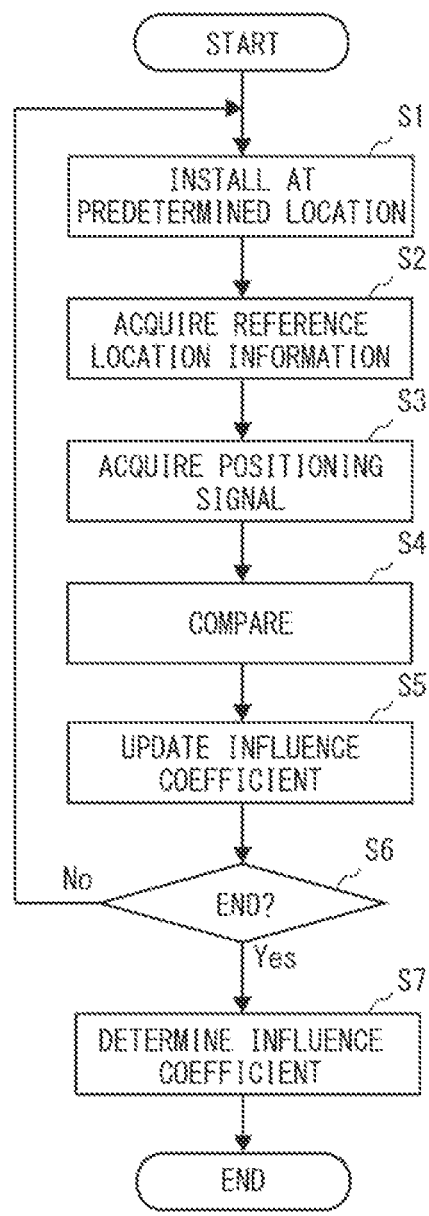
FIG. 2 is a flowchart showing an example of a step for generating an influence coefficient accumulated by the information processing apparatus.

Next, the influence coefficient accumulated by the accuracy index calculation unit 103 will be described with reference to FIG. 2. FIG. 2 is a flowchart showing an example of a step for generating the influence coefficient accumulated by the information processing apparatus. The influence coefficient is generated in advance by a manufacturer or the like of the information processing apparatus 100 according to this example embodiment. Here, processing in which a computer used by the above-mentioned manufacturer or the like generates the influence coefficient will be described.

First, the computer is placed in a predetermined location (Step S1). Here, it is assumed that the predetermined location is acquired in advance in order to verify the accuracy of the positioning signal, as will be described later.

Next, the computer acquires reference location information at the predetermined location (Step S2). The reference location information is information for verifying the location where the computer is installed with the positioning signal. That is, the reference location information is information corresponding to information such as the parameters generated from the positioning signal, and is known information which is accurate information.

Next, the computer acquires the positioning signal at the installed position (Step S3). That is, the computer is connected to, for example, the GNSS receiver and receives the positioning signal from the connected GNSS receiver.

Next, the computer compares the reference location information with the positioning signal received from the GNSS receiver (Step S4). Here, for example, the computer compares a predetermined parameter included in the reference location information with a parameter included in the positioning signal.

Next, the computer updates the influence coefficient based on a result of the comparison (Step S5). The influence coefficient is updated, for example, using the multiple regression equation shown in the following Formula (4).

[Formula 4]

$$y_{ac} = a_0 + a_1 \times P_1 + a_2 \times P_2 + a_3 \times P_3 + a_4 \times P_4 \quad (4)$$

Here, $y_{ac}$ is the accuracy index, which indicates a difference between a position related to the reference location information and a position determined by the positioning signal. The accuracy index is, for example, a numerical value obtained by multiplying a distance between the position related to the reference location information and the position included in the positioning signal or a distance by a predetermined coefficient. Further, $a_0$ to $a_4$ are partial regression coefficients for respective parameters, and $P_1$ to $P_4$ are parameters (clock error, tropospheric delay, ionospheric delay, or carrier phase bias, etc.) acquired from the positioning signal. The partial regression coefficient is calculated by comparing a plurality of times of comparisons between the reference location information with the positioning signal. In the example shown here, the partial regression coefficient thus calculated is updated as the influence coefficient. Although the parameters are $P_1$ to $P_4$ in Formula (4), the number of parameters may be set to any number, as a matter of course.

Next, the computer determines whether or not to end the processing of generating the influence coefficient (Step S6). If it is not determined that the processing for generating the influence coefficient is ended (Step S6: No), the computer is installed at a place different from or the same as the past position (Step S1), and the reference location information is compared with the positioning signal again, and then the influence coefficient is updated. On the other hand, when it is determined that the processing for generating the influence coefficient is ended (Step S6: Yes), the computer determines the influence coefficient based on the result updated by the processing performed so far (Step S7). The manufacturer or the like causes the information processing apparatus 100 to store the influence coefficient thus determined.

The influence coefficient is generated by the above processing. The manufacturer or the like extracts the generated influence coefficient and stores the extracted influence coefficient in advance in the information processing apparatus 100.

The first example embodiment has been described so far, but the configuration according to this example embodiment is not limited to this. For example, the information processing apparatus 100 may acquire one parameter from the positioning signal and calculate the accuracy index by performing a simple regression analysis of the parameter. The calculation of the accuracy index performed in the information processing apparatus 100 may be performed using an artificial neural network such as a probabilistic neural network, a convolutional neural network, or a recursive neural network instead of the multiple regression analysis. The calculation of the accuracy index performed by the information processing apparatus 100 is not limited to the above-described method, and may be other probability calculation. In the method for determining the influence coefficient described with reference to FIG. 2, instead of the multiple regression analysis, calculation using an artificial neural network or calculation by machine learning may be performed.

The information processing apparatus 100 according to this example embodiment may be mounted on an automobile, a ship, an aircraft, a drone, a motorcycle, or the like, as long as the mobile body has a function of positioning the location of the mobile body using GNSS signals. In addition to the mobile body, the information processing apparatus 100 according to this example embodiment may be mounted on a personal computer, smartphone, a wristwatch, or a helmet which has a function of positioning the location of itself using GNSS signals.

With the above configuration, the information processing apparatus 100 according to this example embodiment outputs the accuracy index related to the acquired positioning signal. Therefore, according to this example embodiment, it is possible to provide an information processing apparatus or the like for determining the reliability of the positioning result using the positioning signal received from the GNSS satellite.

Second Example Embodiment

Figure 3:
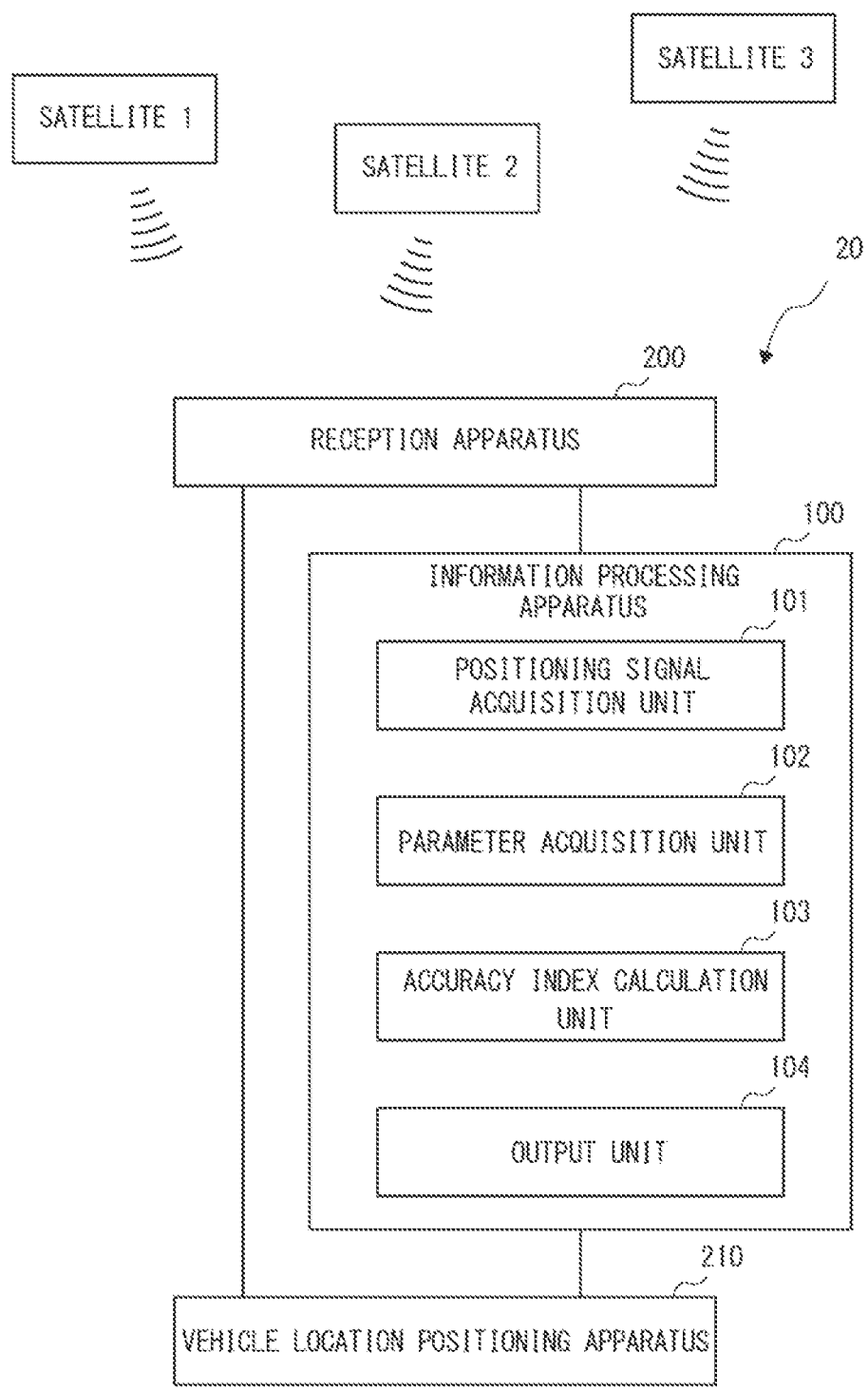
FIG. 3 is a schematic block diagram of an information processing system according to a second example embodiment.

Next, a second example embodiment will be described. The second example embodiment is different from the first example embodiment in that a system according to the second example embodiment includes other components in addition to the components of the above-described information processing apparatus 100. FIG. 3 is a schematic configuration diagram of an information processing system according to the second example embodiment. An information processing system 20 shown in the drawing mainly includes a reception apparatus 200, an information processing apparatus 100, and a vehicle location positioning apparatus 210.

The reception apparatus 200 receives radio waves transmitted from a GNSS satellite and generates a positioning signal from the received radio wave. Then, the reception apparatus 200 supplies the positioning signal to the information processing apparatus 100 and the vehicle location positioning apparatus 210. The reception apparatus includes an antenna for receiving the radio waves from the GNSS satellite and a circuit for amplifying, demodulating, etc., the radio waves received by the antenna. As shown in the drawing, when there are satellites 1 to 3 that transmit the radio waves receivable by the reception apparatus 200, the reception apparatus 200 receives the radio waves from each of the satellites, generates the positioning signals for them, and supplies these signals to the information processing apparatus 100 and the vehicle location positioning apparatus 210.

The vehicle location positioning apparatus 210 receives the positioning signal from the reception apparatus 200 and positions the location of its own vehicle from the received positioning signal. More specifically, the position of the its own vehicle can be calculated from a distance between each GNSS satellite and the vehicle, time information, and the like from the positioning signals of the respective GNSS satellites.

The vehicle location positioning apparatus 210 receives information about the accuracy index and the positioning signal corresponding to the accuracy index from the information processing apparatus 100. Then, the vehicle positioning apparatus 210 refers to the received accuracy index and the like to determine how to handle the positioning signal received from the reception apparatus 200.

In addition, the vehicle location positioning apparatus 210 may include a gyro sensor or the like as means for estimating the location of its own vehicle in addition to the positioning signal received from the reception apparatus 200. By including the gyro sensor or the like, the vehicle location positioning apparatus 210 can estimate the location of its own vehicle when the positioning signal cannot be acquired. Further, the vehicle location positioning apparatus 210 can estimate the location of its own vehicle even when the positioning signal can be acquired. In such a case, the vehicle location positioning apparatus 210 can select between positioning based on the positioning signal from the GNSS satellites and positioning estimated by the gyro sensor or the like to determine the location of its own vehicle.

Figure 4:
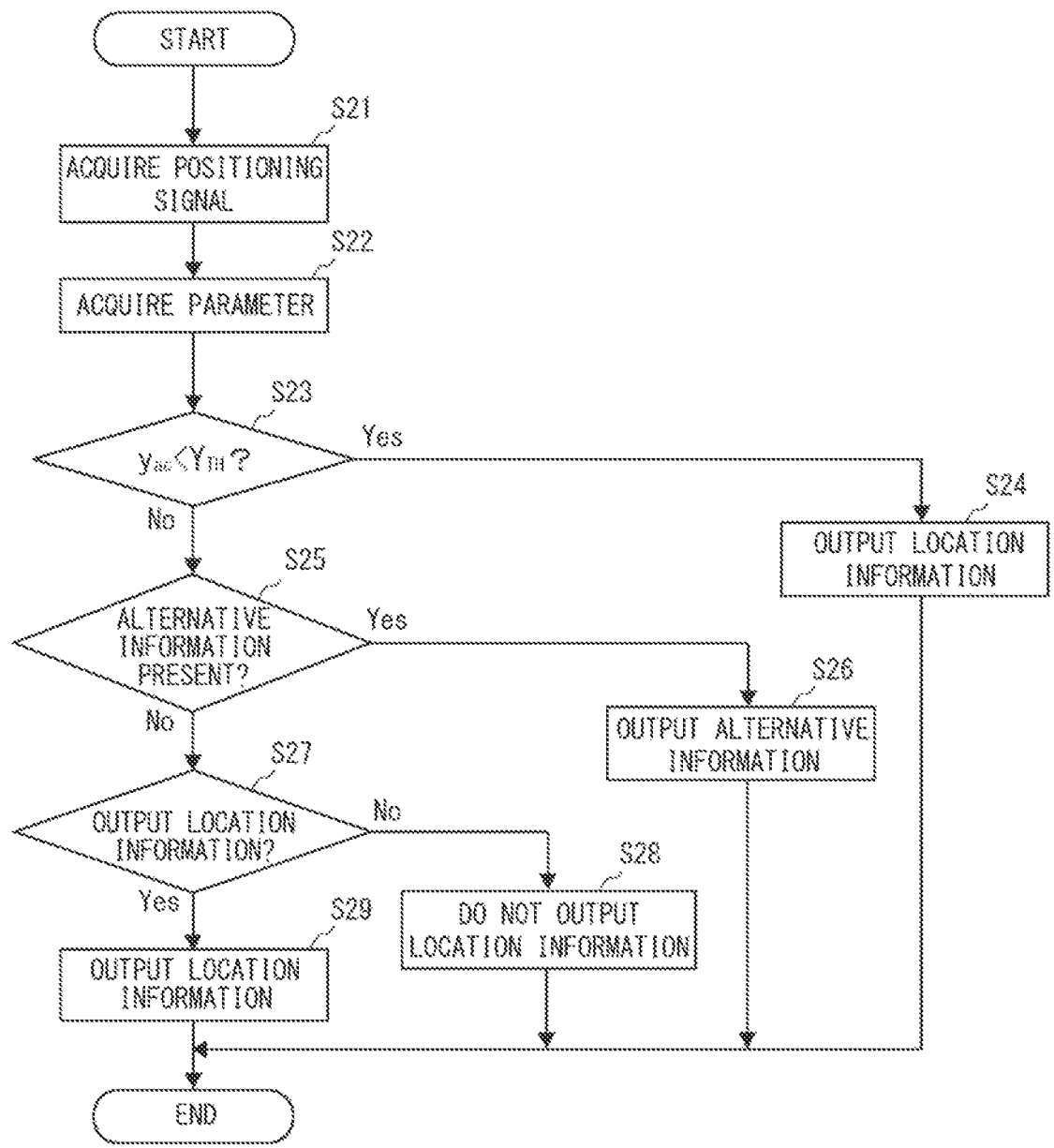
FIG. 4 is a flowchart of processing performed by the information processing apparatus according to the second example embodiment.

Next, an example of the processing of the information processing system 20 will be described with reference to FIG. 4. FIG. 4 is a flowchart of processing performed by the information processing apparatus according to the second example embodiment.

The reception apparatus 200 receives the radio waves from the GNSS satellites and acquires the positioning signals from the received radio waves (Step S21). The reception apparatus 200 supplies the acquired positioning signals to the information processing apparatus 100 and the vehicle location positioning apparatus 210.

Next, the information processing apparatus 100 acquires parameters from the positioning signal received from the reception apparatus 100 by the parameter acquisition unit 102 included in the information processing apparatus 200 (Step S22). The parameter acquisition unit 102 supplies the acquired parameters to the accuracy index calculation unit 103.

Next, the information processing system 20 determines whether or not the positioning signal is degraded (Step S23). Specifically, in Step S23, the accuracy index calculation unit 102 calculates the accuracy index using the parameters received by the parameter acquisition unit 103. Then, as described with reference to FIG. 1, the output unit 104 outputs the accuracy index. The accuracy index output from the output unit 104 is supplied to the vehicle location positioning apparatus 210. The vehicle positioning apparatus 210 determines whether or not the positioning signal related to the received accuracy index is degraded from the value of the accuracy index received from the information processing apparatus 100. To be more specific, the degradation of the positioning signal is determined based on the magnitude of the value of the accuracy index. For example, the vehicle positioning apparatus 210 does not determine that the positioning signal is degraded when an accuracy index $_{yac}$ is smaller than a threshold $Y_{TH}$ set for the value of the accuracy index, whereas the vehicle positioning apparatus 210 determines that the positioning signal is degraded when the accuracy index $_{yac}$ is not smaller than the threshold $Y_{TH}$.

If the accuracy index $_{yac}$ is smaller than the threshold $Y_{TH}$ (Step S23: Yes), the information processing system 20 outputs the location of its own vehicle calculated from the positioning signal as own vehicle location information (Step S24). After the own vehicle location information is output, the information processing system 20 ends the processing.

On the other hand, when the accuracy index $_{yac}$ is not smaller than the threshold $Y_{TH}$ (Step S23: No), the information processing system 20 does not output the own vehicle location calculated from the positioning signal as the own vehicle location information, and proceeds to Step S25.

Next, the vehicle location positioning apparatus 210 determines whether or not there is alternative information (Step S25). When the means for estimating the location of its own vehicle such as the above-described gyro sensor is included, the vehicle location positioning apparatus 210 determines that the alternative information is present (Step S25: Yes). In this case, the vehicle location positioning apparatus 210 outputs the alternative information (Step S26), and then ends the processing. On the other hand, the means for estimating the location of the vehicle is not included, the vehicle positioning apparatus 210 does not determine that the alternative information is present (Step S25: No), and proceeds to Step S27.

Next, the vehicle location positioning apparatus 210 determines whether or not to output the location information calculated from the positioning signal (Step S27). If the vehicle location positioning apparatus 210 does not determine that the location information calculated from the degraded positioning signal is to be output (Step S27: No), the information processing system 20 does not output the location information (Step S28), and ends the processing. On the other hand, when the vehicle location positioning apparatus 210 determines that the location information calculated from the degraded positioning signal is to be output (Step S27: Yes), the information processing system 20 outputs the location information (Step S29). After outputting the location information, the information processing system 20 ends the processing.

The information processing system 20 according to the second example embodiment has been described so far.

According to the second example embodiment, it is possible to determine the reliability of the positioning result using the positioning signal received from the GNSS satellite, and to determine whether or not to output the location information calculated from the acquired positioning signal according to the determined result. When the alternative information is present, the alternative information can be output when the accuracy of the positioning signal is not high. With this configuration, the information processing system 20 according to the second example embodiment can output the own vehicle location information with higher reliability.

Third Example Embodiment

Figure 5:
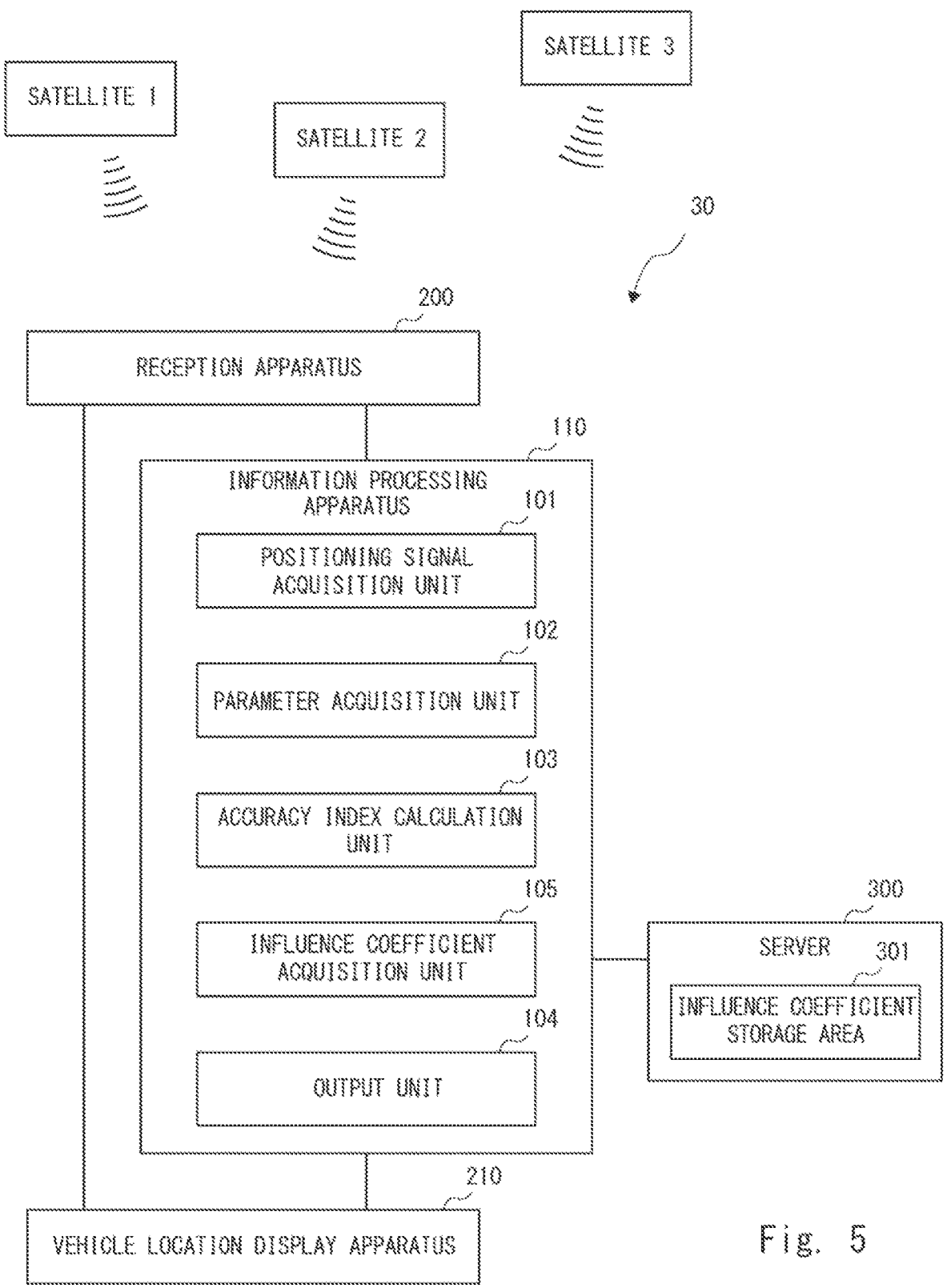
FIG. 5 is a schematic block diagram of an information processing system according to a third example embodiment.

Next, a third example embodiment will be described. An information processing system according to the third example embodiment is different from that according to the second example embodiment in that the information processing system according to the third example embodiment is configured to acquire an influence coefficient from the outside. FIG. 5 is a schematic configuration diagram of the information processing system according to the third example embodiment.

An information processing system 30 shown in the drawing includes an information processing apparatus 110 in place of the information processing apparatus 100 according to the second example embodiment. The information processing apparatus 110 includes an influence coefficient acquisition unit 105 in addition to the configuration of the information processing apparatus 100 described above. The information processing apparatus 110 is connected to a server 300.

The influence coefficient acquisition unit 105 acquires the influence coefficient transmitted from the server 300. The influence coefficient acquisition unit 105 supplies the acquired influence coefficient to the accuracy index calculation unit 103. Thus, the accuracy index calculation unit 103 calculates the accuracy index from the parameters received from the parameter acquisition unit 102 and the influence coefficient received from the influence coefficient acquisition unit 105. The influence coefficient acquisition unit 105 has a function of requesting the influence coefficient from the server 300.

The server 300 is connected to the information processing system 30 in such a way that the server 300 can communicate with the information processing system 30. The server 300 is, for example, a computer connected to the information processing system 30 in such a way that the server 300 can wirelessly communicate with the information processing system 30. The server 300 includes an influence coefficient storage area 301. The influence coefficient storage area 301 is a non-volatile storage device, and is composed of, for example, a flash memory, an HDD (Hard Disc Drive), SSD (Solid State Drive), and so on. The influence coefficient storage area 301 stores the influence coefficient determined by the method described with reference to FIG. 2. The server 300 transmits the influence coefficient in response to the request from the information processing system 30 as appropriate. With this configuration, the information processing system 30 can calculate the accuracy index using the influence coefficient transmitted from the server 300.

The server 300 can store a plurality of kinds of influence coefficients in the influence coefficient storage area 301. That is, the server 300 stores a plurality of kinds of influence coefficients, and can transmit the influence coefficient selected from among the plurality of kinds of influence coefficients to the information processing system 30. With such a configuration, the information processing system 30 can accumulate a plurality of influence coefficients as in the following example, and use them separately in response to the request of the information processing apparatus 110.

The reason why the server 300 stores the plurality of kinds of influence coefficients is, for example, the following circumstances. As described with reference to FIG. 2, the influence coefficient degree is determined by accumulating a plurality of parameters and the accuracy indices included in the positioning signals, and the accuracy index measured in generating such an influence coefficient tends to fluctuate due to the influence of fluctuations in the ionosphere, the troposphere, and so on. The ionosphere and troposphere tend to fluctuate depending on the time of day, season, weather, and the like. For example, in the ionosphere and the troposphere, an electron density and the like in the daytime when the sunlight shines tend to be different from an electron density and the like after sunset when no sunlight shines. Therefore, the plurality of kinds of influence coefficients are distinguished by, for example, the location, time, season, weather, and the like at the time of determining the influence coefficient.

It is obvious that the positioning signal for determining the influence coefficient is also affected by the location at which the positioning signal is acquired. For example, in an urban area where high-rise buildings stand side by side, interruption and multipath of the positioning signal are likely to occur. Thus, a plurality of kinds of influence coefficients are also distinguished by the location.

Under the circumstances described above, the server 300 can store the influence coefficients determined under a plurality of conditions, and can transmit the influence coefficient selected from among the plurality of influence coefficients to the information processing system 30.

Figure 6:
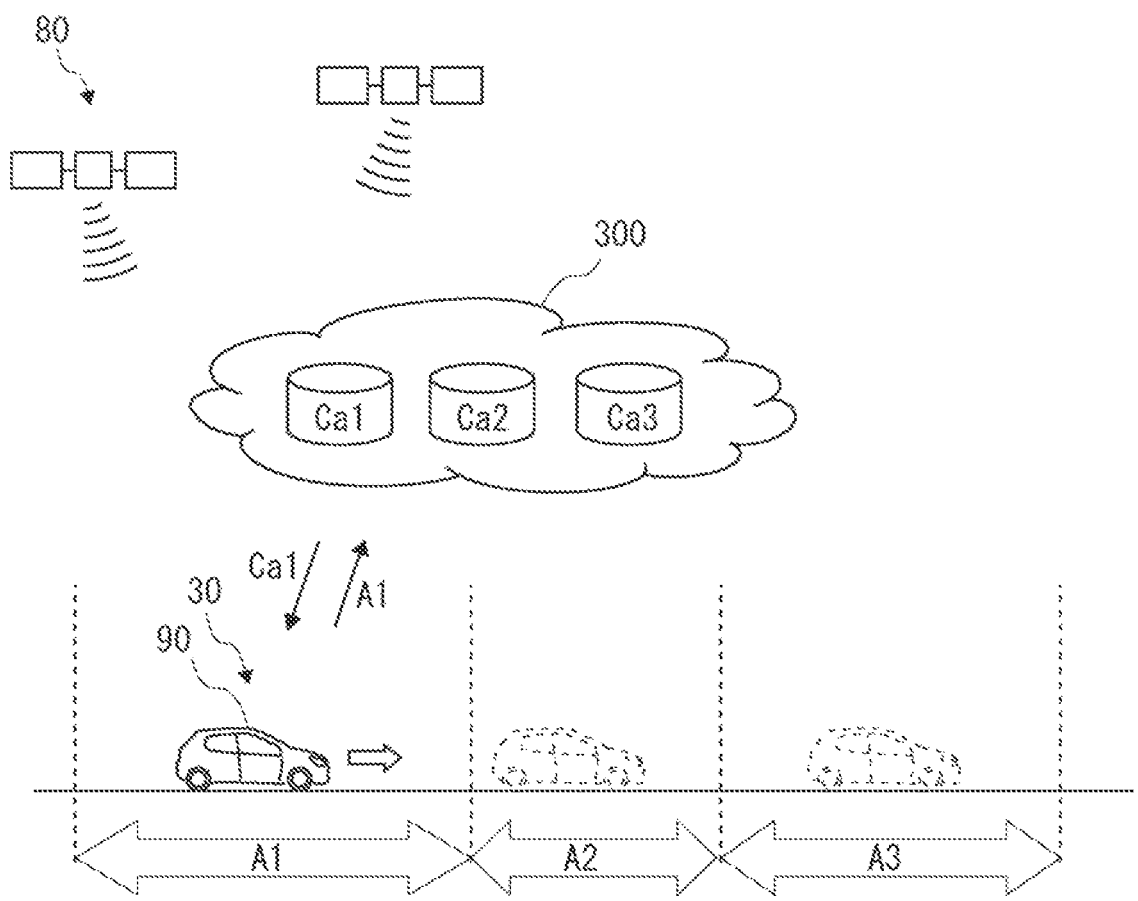
FIG. 6 is a diagram for explaining an operation of the information processing system according to the third example embodiment.

Next, an example of the operation of the server 300 and the information processing system 30 for storing the plurality of influence coefficients will be described with reference to FIG. 6. FIG. 6 is a diagram for explaining the operation of the information processing system according to the third example embodiment. An automobile 90 shown in the drawing includes the information processing system 30. The information processing system 30 is connected to the server 300 installed at a specified place in such a way that the information processing system 30 can wirelessly communicate with the server 300. In the drawing, the automobile 90 is located in an area A1, and is moving in the direction of the arrow (right side of the drawing) while positioning the location of the automobile 90. The automobile 90 is expected to move from the area A1 to an area A2 and further to an area A3 after the state shown in the drawing. An example of the operation of the information processing system 30 in such a situation will be described below.

The information processing system 30 of the automobile 90 located in the area A1 performs positioning of the location of the automobile 90 while receiving the positioning signals transmitted from a plurality of GNSS satellites 80. The information processing system 30 receives the influence coefficient from the server 300 and calculates the accuracy index using the received influence coefficient. At this time, the information processing system 30 notifies the server 300 that the automobile 90 is located in the area A1, and requests the influence coefficient from the server 300. The server 300 transmits an influence coefficient Ca1 corresponding to the area A1 to the information processing system 30 located in the area A1. The information processing system 30 acquires the influence coefficient Ca1 from the server 300 and calculates the accuracy index using the acquired influence coefficient Ca1.

After that, when the automobile 90 moves from the area A1 to the area A2, the information processing system 30 detects that the automobile 90 is located in the area A2 by the positioning signal. In this case, the information processing system 30 notifies the server 300 that the automobile 90 is located in the area A2, and requests the influence coefficient from the server 300. The server 300 transmits an influence coefficient Ca2 corresponding to the area A2 to the information processing system 30 located in the area A2.

The same processing is performed when the automobile 90 moves from the area A2 to the area A3. That is, the server 300 transmits an influence coefficient Ca3 corresponding to the area A3 to the information processing system 30 located in the area A3.

In this manner, the information processing system 30 acquires the influence coefficient corresponding to each area from the server 300, and calculates the accuracy index corresponding to each area using the acquired influence coefficient. The information processing system 30 receives the influence coefficient corresponding to each area in this way, and calculates the accuracy index using the received influence coefficient.

Although the third example embodiment has been described so far, the information processing system 30 according to the third example embodiment is not limited to the above-described configuration. For example, the influence coefficient acquisition unit 105 may not have a function of requesting the influence coefficient from the server 300, and may be configured to receive a signal including the influence coefficient broadcasted by the server 300. In this case, the server 300 transmits area information and a signal associated with the influence coefficient corresponding to the area information. Then, the information processing system 30 positions its own location and extracts the signal including the influence coefficient corresponding to the positioned location from the received signal.

Further, the server 300 is not limited to the example shown in FIG. 6, and the influence coefficient to be transmitted may be changed according to, for example, time of day, season, or weather.

With the above configuration, the information processing system 30 according to the third example embodiment can provide an information processing apparatus or the like for determining the reliability of a positioning result according to the situation where the vehicle to be positioned is placed. Thus, the information processing system 30 according to the third example embodiment can output highly reliable vehicle location information.

Note that the present disclosure is not limited to the above-described example embodiments, and may be modified as appropriate without departing from the spirit of the disclosure.

In the above example embodiments, the present disclosure has been described as a hardware configuration, but the present disclosure is not limited to this. The present disclosure can also be realized by causing a CPU (Central Processing Unit) to execute a computer program for specified processing (e.g., the processing of the flowchart of FIG. 2 or 4). The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from Japanese patent application No. 2018-180823, filed on Sep. 26, 2018, the disclosure of which is incorporated herein in its entirety by reference.

REFERENCE SIGNS LIST

20 INFORMATION PROCESSING SYSTEM
30 INFORMATION PROCESSING SYSTEM
80 GNSS SATELLITE
90 AUTOMOBILE
100 INFORMATION PROCESSING APPARATUS
101 POSITIONING SIGNAL ACQUISITION UNIT
102 PARAMETER ACQUISITION UNIT
103 ACCURACY INDEX CALCULATION UNIT
104 OUTPUT UNIT
105 INFLUENCE COEFFICIENT ACQUISITION UNIT
110 INFORMATION PROCESSING APPARATUS
200 RECEPTION APPARATUS
210 VEHICLE LOCATION POSITIONING APPARATUS
300 SERVER
301 INFLUENCE COEFFICIENT STORAGE AREA

What is claimed is:

1. An information processing apparatus comprising:
one or more memories storing instructions; and
one or more processors configured to execute the instructions to control:
   a positioning signal acquisition unit to acquire a positioning signal transmitted from a positioning satellite;
   a parameter acquisition unit to calculate a parameter preset based on the positioning signal;
   an accuracy index calculation unit to calculate a positioning accuracy index from the parameter; and
   an output unit to output the positioning accuracy index,
wherein the accuracy index calculation unit calculates the positioning accuracy index by regression analysis based on the parameter and an influence coefficient, which is a partial regression coefficient to be multiplied against the parameter according to the parameter.

2. The information processing apparatus according to claim 1, wherein
the parameter acquisition unit acquires at least one of a value of a geometric distance, a clock error, an ionospheric delay, a tropospheric delay, and a carrier phase bias as the parameter.

3. The information processing apparatus according to claim 1, wherein
the accuracy index calculation unit determines the influence coefficient to be used according to at least one condition from among a position, a time, and a weather of a positioning object.

4. The information processing apparatus according to claim 1, wherein the one or more processors are further configured to execute the instructions to control an influence coefficient acquisition unit to acquire the influence coefficient, and the accuracy index calculation unit calculates the positioning accuracy index based on the influence coefficient acquired from the influence coefficient acquisition unit.

5. An information processing system comprising:
the information processing apparatus according to claim 1; and
a reception apparatus configured to receive the positioning signal.

6. An information processing system comprising:
the information processing apparatus according to claim 1; and
an information providing apparatus configured to provide the influence coefficient to the information processing apparatus.

7. An information processing method comprising:
acquiring a positioning signal transmitted from a positioning satellite;
calculating a parameter preset based on the positioning signal;
calculating a positioning accuracy index from the parameter; and
outputting the positioning accuracy index,
wherein the method further comprises calculating the positioning accuracy index by regression analysis based on the parameter and an influence coefficient, which is a partial regression coefficient to be multiplied against the parameter according to the parameter.

8. A non-transitory computer readable medium storing a program causing a computer to execute an information processing method comprising:
acquiring a positioning signal transmitted from a positioning satellite;
calculating a parameter preset based on the positioning signal;
calculating a positioning accuracy index from the parameter; and
outputting the positioning accuracy index,
wherein the method further comprises calculating the positioning accuracy index by regression analysis based on the parameter and an influence coefficient, which is a partial regression coefficient to be multiplied against the parameter according to the parameter.

* * * * *